United States Patent

Chene et al.

[15] 3,657,066
[45] Apr. 18, 1972

[54] WET-STRENGTHENED CARBOXYLATED CELLULOSIC MATERIALS CONTAINING MELAMINE FORMALDEHYDE RESIN AND A PROCESS FOR PREPARING THE SAME

[72] Inventors: Marcel Chene, True Marcel Benoit, Grenoble; Jean Pierre Quiles, Lenomeau Fleauri-villa 93, Momtbommot 38; Jean Francis Lafaye, 30 rue Edonard Voillant, Grenoble 38, all of France

[22] Filed: Dec. 29, 1969

[21] Appl. No.: 888,982

[52] U.S. Cl. ................................162/166, 8/108.5, 8/116.2, 162/182
[51] Int. Cl. .........................................................D21d 3/00
[58] Field of Search ..................162/166, 182, 78, 88, 157 C; 8/116.2, 108.5; 117/155 L

[56] References Cited

UNITED STATES PATENTS

| | | | |
|---|---|---|---|
| 2,991,194 | 7/1961 | Camrron | 117/155 L |
| 2,999,789 | 9/1961 | Quinn | 162/166 |
| 3,487,048 | 12/1969 | Devzeman | 260/67.6 |

OTHER PUBLICATIONS

Scaur and Levy, Influence of Oxidation of Pulp on Wet Strength Tappi, May 15, 1947 pp. 221–224
Landes and Maxwell, A Study of the Melamine Resin Process for Producing Wet Strength Paper, Aug. 9, 1945, Tappi, pp. 51–60

*Primary Examiner*—S. Leon Bashore
*Assistant Examiner*—Richard H. Anderson
*Attorney*—Wm. J. Foley, John W. Kane, Jr., J. A. Weygandt and M. L. Faigus

[57] ABSTRACT

A method of preparing fibrous cellulosic materials containing resins such as trimethylolmelamine so as to improve bonding between fibers and the wet state and conditioned state resistances, said method being one in which cellulose fibers are oxidized with an alkali metal periodate to form aldehyde groups in the 2 and 3 positions, and the aldehyde containing cellulose fibers are then further oxidized with an alkali metal chlorite to form carboxyl groups in the 2 and 3 positions, and the resin precursor is reacted in acidic medium and is mainly retained by an ion exchange mechanism on cellulose fibers, those fibers then being used on paper or cardboard machines; and the new products so obtained.

3 Claims, No Drawings

WET-STRENGTHENED CARBOXYLATED CELLULOSIC MATERIALS CONTAINING MELAMINE FORMALDEHYDE RESIN AND A PROCESS FOR PREPARING THE SAME

BACKGROUND OF THE INVENTION

1. Field of the Invention

The present invention relates generally to the field of cellulose compounds and paper pastes, and concerns, more particularly, a method of producing cellulose compounds having fixed thereon certain melamine-formaldehyde resin precursors, and the various new articles of manufacture produced thereby.

In one aspect, this invention relates to a method of producing oxidized cellulose fibers on which are retained especially melamine-formaldehyde resin precursors so as to reinforce bonding between fibers of papers and other cellulosic products made from such fibers. In another aspect, this invention relates to the retention of melamine-formaldehyde resin precursors by sulfuric esters of cellulose.

2. Description of Prior Art

Heretofore, from the data of technical literature and patents, the ability of cellulose derivatives to retain high rates of melamine-formaldehyde resins, so as to improve bonding between cellulose fibers to obtain paper-like products was not known.

Therefore, the main object of this invention is to provide methods of retaining melamine-formaldehyde type resins on cellulose, many cellulose derivatives and other fiber constituents.

SUMMARY OF THE INVENTION

According to the invention, it has been now found that resin precursors of melamine-formaldehyde resins could be retained on suitably oxidized fibers. The influence of oxidation is predominant because the amount of the retained resin precursor is increased by increasing the carboxyl rate.

According to the invention, there is provided a method of preparing cellulose fibers retaining resin precursors so as to improve bonding between fibers and the wet state and conditioned state resistances, said resin precursors being especially selected from the group comprising melamine-formaldehyde resin precursors in which cellulose fibers are submitted to an oxidation resulting in creating carboxyl groups in 2, 3 or 6 position, and, on oxycelluloses obtained thereby, the resin precursor is reacted in acidic medium and is mainly retained by an ion exchange mechanism on cellulose fibers, those fibers being used on paper or cardboard machines.

As an example, only the case of an oxidation on 2, 3 position of cellulose will be considered; cellulose fibers may be regenerated cellulose fibers, for example those of regenerated viscose.

The oxidation of cellulose may be carried out by sodium metaperiodate at room temperature; in this case, it leads to the formation of aldehydes in 2 and 3 positions. A further oxidation by sodium chlorite converts carbonyl groups into carboxyl groups. Oxidation through $NO_2$ leads to aldehyde groups in 6 position.

Laboratory studies of exchanges made on diversely oxidated fibers is carried out generally in a standardized apparatus for carboxyl dosage. The resin precursor is dissolved in hydrochloric acid and diluted. Previously defibered and demineralized samples are taken and the resin precursor solution is added in small increments, the final percentage of used resin precursor reacting about 2 g. per 100 g. cellulose.

The pH of the resin precursor solution may be from 6,5 to about 3; the reaction will be preferably realized at a pH near 6 so as to obtain a maximum ion exchange. The influence of extra ions will be as much as possible eliminated; indeed, when $H^+$ ions are accompanied with extra-cation, the retention of same may be made instead of the resin precursor.

The melamine-formaldehyde resin precursor is retained by ion exchange on carboxyls according to the following mechanism:

1. formation of a cation in acidic medium:
$$M + H^+ \rightarrow MH^+$$
$M =$ trimethylolmelamine 2. Exchange with $H^+$ ions of acidic groups of cellulose:
$$Cell \cdot COOH + MH^+ \rightarrow Cell \cdot COOMH + H^+$$

It should be noted that this mechanism would be similar with carboxyl groups in 6 position as well as with such groups as $SO_3H$. It is very important to remark that the resin precursor should have, by association with $H^+$ ions, a strong positive charge so as to be in the best ion exchange conditions.

In addition to this fixation through ion exchange, there may exist a fixation through hydrogen bonds and a fixation due to purely mechanical action, for example the filtration of the colloid through very fine mesh of the forming sheet. These conclusions result from tests carried out with native cellulose fibers and cellulose regenerated from viscose, from which oxycelluloses have been prepared.

According to this invention, there is also provided a method of producing sulfuric esters of cellulose to which will be retained resin precursors selected from the group comprising melamine-formaldehyde resin precursors in which the reaction on cellulose fibers is made in alcoholic medium, in the presence of concentrated sulfuric acid so as to obtain the ester and the resin precursor is made to react in an acidic medium so as to make the resin precursor/sulfuric cellulose ester exchange.

The following embodiments are only given as an illustration of this invention, without any limitation.

EXAMPLE 1

Retention of resin precursor at constant pH

Polynosic fibers (regenerated cellulose for paper-making applications) are treated by sodium metaperiodate 0.1 Molar, at room temperature and in darkness.

Dialdehydes are converted into diacids by a sodium chlorite solution made acidic at pH = 3.

As a confirmation of the influence of carboxyl groups, aldehyde groups are converted into alcohol groups through treatment by a sodium borohydride solution.

Ion exchange is conducted in the following manner: 600 mg of trimethylolmelamine (known under trademark PAREZ 607) are dissolved within 5 ml. of hydrochloric acid at 16.5 g./l., then diluted immediately to 2 l with deionized water. Exchange is made in the carboxyl apparatus, on samples of about 1 g., previously defibered and dimineralized. The thus prepared trimethylolmelamine solution at a concentration of 300 mg./l. is added in small increments of 25 or 50 ml.; after filtration, the pH of each cut is measured.

The obtained results are collected in tables I through V.

TABLE I

Ion exchange resin precursor-viscose cellulose as a blank 1.9 millequivalents of CHO/100 g. to 2 millequivalents of COOH/100 g.

| Exchanged volume (ml.) | Initial pH | Filtrate pH | Introduced resin precursor, milligrams/gram of paste | Retained resin precursor, milligrams/gram of paste | Percent |
|---|---|---|---|---|---|
| 50 | 3.23 | 3.20 | 17.1 | 2.49 | 14.5 |
| 100 | 3.32 | 3.32 | 33.7 | 3.59 | 10.6 |
| 150 | 3.46 | 3.46 | 51.5 | 5.54 | 10.7 |
| 200 | 3.28 | 3.28 | 67.8 | 3.25 | 4.8 |

TABLE II

Viscose fibers oxidated with metaperiodate 2 millequivalents of

COOH/100 g. and 101 millequivalents of CHO/100 g.

| Exchanged volume (ml.) | Initial pH | Filtrate pH | Introduced resin precursor, milligrams/ gram of paste | Retention Retained resin precursor, milligrams/ gram of paste | Percent |
|---|---|---|---|---|---|
| 50 | 3.38 | 3.34 | 17.1 | 1.77 | 10.3 |
| 100 | 3.52 | 3.48 | 34.4 | 2.492 | 7.25 |
| 150 | 3.52 | 3.51 | 49.8 | 2.9 | 5.8 |
| 200 | 3.52 | 3.52 | 68.5 | 3.15 | 4.6 |

TABLE III

Viscose fibers oxidated with metaperiodate, suroxidated with chlorite 67.8 millequivalents of COOH/100 g.

| Exchanged volume (ml.) | Initial pH | Filtrate pH | Introduced resin precursor, milligrams/ gram of paste | Retention Retained resin precursor, milligrams/ gram of paste | Percent |
|---|---|---|---|---|---|
| 50 | 3.23 | 2.96 | 16.8 | 10.91 | 64.6 |
| 100 | 3.32 | 3.1 | 34.1 | 17.1 | 50.4 |
| 150 | 3.46 | 3.25 | 51.2 | 24.13 | 47.5 |
| 200 | 3.28 | 3.12 | 67.1 | 37.6 | 56 |
| 250 | 3.38 | 3.12 | 88.8 | 40.87 | 46.1 |

TABLE IV

Viscose fibers oxidated with metaperiodate, suroxidated with chlorite 140 millequivalents of COOH/100 g.

| Exchanged volume (ml.) | Initial pH | Filtrate pH | Introduced resin precursor, milligrams/ gram of paste | Retention Retained resin precursor, milligrams/ gram of paste | Percent |
|---|---|---|---|---|---|
| 150 | 3.43 | 3.15 | 43.3 | 26.19 | 60.5 |
| 250 | 3.56 | 3.30 | 77 | 37.19 | 48.3 |

TABLE V

Viscose fibers oxidated with metaperiodate 101 millequivalents of

CHO/100 grams reduced with sodium borohydride 1.46 millequivalents CHO/100 g.

| Exchanged volume (ml.) | Initial pH | Filtrate pH | Introduced resin precursor, milligrams/ gram of paste | Retention Retained resin precursor, milligrams/ gram of paste | Percent |
|---|---|---|---|---|---|
| 50 | 3.33 | 3.3 | 1.62 | 1.52 | 9.4 |
| 100 | 3.33 | 3.33 | 93.6 | 2.3 | 6.8 |
| 150 | 3.33 | 3.33 | 50.8 | 2.1 | 4.1 |
| 200 | 3.33 | 3.33 | 68.7 | 2.21 | 3.2 |

From these results, it appears very well that the retention of melamine-formaldehyde resin precursor is clearly increased by increasing the carboxyl rate.

EXAMPLE 2

Resin precursor retention against pH of the exchange solution

The used resin precursor is supplied in solution; its pH is near 6 after dilution. Exchanges are carried out as in Example 1, the pH of exchange solution being decreased by adding hydrochloric acid.

Results are presented in Table VI which shows the importance of initial pH of the resin precursor solution during ion exchange.

TABLE VI

Resin precursor retention against pH (Viscose suroxidated with chlorite: 79 millequivalents COOH/100 g.

| Initial pH | pH of the filtrate | Introduced resin precursor, milligrams/ gram of paste (exchanged volume = 100 cm.³) | Retention Retained resin precursor, milligrams/ gram of paste | Percent |
|---|---|---|---|---|
| 6.58 | 3.9 | 18.2 | 15.9 | 87.5 |
| 5.68 | 3.74 | 18.25 | 14.45 | 79.7 |
| 4.82 | 3.62 | 18.22 | 14.45 | 79.3 |
| 5.98 | 3.5 | 18.32 | 13.5 | 71.5 |
| 2.98 | 3.5 | 18.32 | 13.5 | 71.5 |
| 2.38 | 2.38 | 18.1 | 10.9 | 60.3 |
| 2.82 | 1.82 | 18.3 | 9.5 | 52 |
| 1.12 | 1.12 | 18.3 | 3 | 16.4 |

EXAMPLE 3

Cellulose treated with $H_2SO_4$

The assay of $SO_3H$ groups is carried out with gravimetry, and also through exchange with zinc acetate.

Results of exchanges and of resin precursor retention on cellulose esters are collected in Table VII.

TABLE VII

Exchange rate=33.6 millequivalents/100 grams

| Weight of paste | Volume of exchanged solution | Initial pH | pH of the filtrate | Introduced resin precursor (percent) | Retention, percent |
|---|---|---|---|---|---|
| 1 gram | 25+ cm.³ <br> 25 cm.³ | 3.31 | 2.96 <br> 2.95 | 1.5 | 87.5 |
| Do | 50+ cm.³ <br> 50 cm.³ | 3.31 | 2.96 <br> 2.96 | 3 | 90 |
| Do | 50 cm.³ <br> 50 cm.³ <br> 50 cm.³ | 3.31 | 2.96 <br> 2.95 <br> 2.98 | 4.5 | 85 |
| Do | 100+ cm.³ <br> 100 cm.³ <br> 100 cm.³ | 3.31 | 2.96 <br> 3.04 <br> 3.2 | 9 | 66.4 |

According to the results of Table VII, it appears that melamine-formaldehyde resin precursor may be, in suitable conditions, retained almost quantitatively by ion exchange.

EXAMPLE 4

Printing of cellulose sheets and retention of resin

The operating conditions are as follows: printing of sheets in the Rapid Kothen "formette," drying under vacuum at 90° C.
1. Printing of sheets without resin (tapwater: 20° French hydrotimetric degrees): 15 g. of fibers are broken down. Dispersion is brought to 2 g/l so as to obtain (formette) sheets of 2 g.

2. Printing of sheets with resin precursor (PAREZ 607 trimethylolmelamine resin precursor; tap water 20 French Degrees): 15 g. of fibers are broken down and the resin precursor, aged for 24 hours, is added; after homogeneization, the dilution is brought to 2 g/l and pH adjusted to 4.

There is indicated in Table VIII the results of resin precursor retention, the amount of introduced resin precursor being 2.1 percent.

TABLE VIII

| | | Retention | |
|---|---|---|---|
| Millequivalents of CHO/100 grams | Millequivalents of COOH/100 grams | Retain resin, milligrams/gram of paste | Percent |
| 2 | 2 | 14.7 | 22 |
| | 2 | 3.72 | 17.4 |
| | 47 | 11.01 | 51.7 |
| | 51.3 | 11.25 | 52.5 |
| 114 | 74 | 13.71 | 64.1 |
| | 87 | 12.88 | 60.1 |
| | 106 | 11.8 | 52.2 |
| | 116 | 10.1 | 47 |

There is remarked that retention goes up to a maximum corresponding to about 75 millequivalents of COOH/100 g. Therefore, bleachings by usual methods should be conducted so as to go near a carboxyl rate of about 75 millequivalents/100 g.

There will be noticed that sheets obtained from oxidated cellulose fibers having melamine-formaldehyde resin precursors retained thereon show substantial increasing in breaking length in the conditioned and wet states.

What is claimed is:

1. A process for preparing cellulose fibers having a melamine-formaldehyde resin precursor fixed thereon which comprises A) oxidizing said cellulose fibers with an alkali metal periodate to form aldehyde groups in the 2 and 3 positions, and the aldehyde-containing cellulose fibers are then further oxidized with an alkali metal chlorite to form carboxyl groups in the 2 and 3 positions, and B) reacting the resulting oxidized cellulose fibers with a melamine-formaldehyde resin precursor in an acid medium at a pH of from about 6.5 to about 3.

2. A process as claimed in claim 1 wherein the melamine-formaldehyde resin precursor is trimethylolmelamine.

3. The cellulose fiber product of the process claimed in claim 1.

* * * * *

PO-1050
(5/69)

UNITED STATES PATENT OFFICE
CERTIFICATE OF CORRECTION

Patent No. 3,657,066     Dated   April 18, 1972

Inventor(s)   Marcel Chene et al

It is certified that error appears in the above-identified patent and that said Letters Patent are hereby corrected as shown below:

Column 4, line 32, "14.45" should be --14.55--

Signed and sealed this 1st day of January 1974.

(SEAL)
Attest:

EDWARD M. FLETCHER, JR.          RENE D. TEGTMEYER
Attesting Officer                Acting Commissioner of Patents